United States Patent [19]

Falzoni et al.

[11] Patent Number: 4,836,041

[45] Date of Patent: Jun. 6, 1989

[54] MOTOR VEHICLE GEARBOX WITH A DEVICE FOR SYNCHRONIZED ENGAGEMENT OF REVERSE

[75] Inventors: GianLuigi Falzoni, Torino; Valter Pastorello, Moncalieri, both of Italy

[73] Assignee: Fiat Auto S.p.A., Torino, Italy

[21] Appl. No.: 218,185

[22] Filed: Jul. 13, 1988

[30] Foreign Application Priority Data

Jul. 13, 1987 [IT] Italy ............................ 67602 A/87

[51] Int. Cl.[4] .............................................. F16H 3/38
[52] U.S. Cl. ........................................ 74/339; 74/329; 74/333
[58] Field of Search ................ 74/320, 321, 322, 325, 74/333, 339, 356, 359, 329

[56] References Cited

U.S. PATENT DOCUMENTS

| | | | |
|---|---|---|---|
| 2,096,304 | 10/1937 | Lapsley | 74/325 |
| 2,227,742 | 1/1941 | Backus | 74/333 |
| 2,256,320 | 9/1941 | Lapsley | 74/339 X |
| 2,290,821 | 7/1942 | Backus | 74/333 |
| 2,311,201 | 2/1943 | Backus | 74/333 |
| 2,572,480 | 10/1951 | Hoffman | 74/333 X |
| 2,862,398 | 12/1958 | Zeidler et al. | 74/342 X |
| 4,257,284 | 3/1981 | Ashaner et al. | 74/329 X |
| 4,263,815 | 4/1981 | Ashaner | 74/339 |
| 4,566,348 | 1/1986 | Akashi et al. | 74/329 X |

FOREIGN PATENT DOCUMENTS 0204664 12/1986 European Pat. Off. .

Primary Examiner—Dwight G. Diehl
Attorney, Agent, or Firm—Sughrue, Mion, Zinn, Macpeak, and Seas

[57] ABSTRACT

A motor vehicle gearbox includes a main shaft and a driven shaft carrying respective meshed gears, and an intermediate reversing shaft carrying an idle reverse gear which is slidable to couple corresponding gears carried by the main shaft and the driven shaft for the engagement of reverse. A device for synchronizing the engagement of reverse are provided, which are carried by the intermediate shaft.

2 Claims, 1 Drawing Sheet

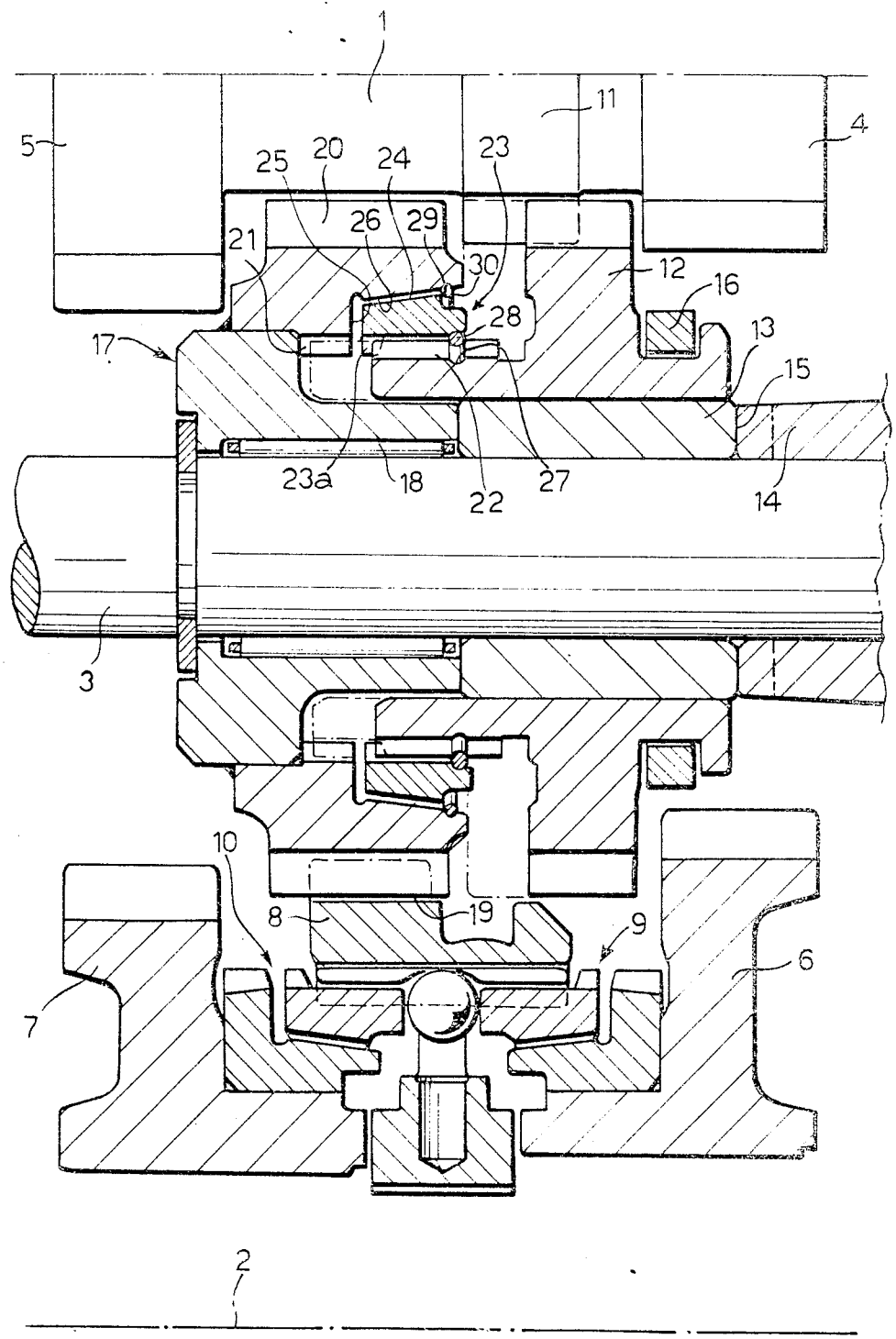

MOTOR VEHICLE GEARBOX WITH A DEVICE FOR SYNCHRONIZED ENGAGEMENT OF REVERSE

DESCRIPTION

The present invention relates in general to motor vehicle gearboxes including a main shaft and a driven shaft carrying respective permanently-meshed gears, of which those carried by the driven shaft can be selectively made fast for rotation therewith by means of respective slidable coupling sleeves, and a reversing shaft carrying an idle reversing gear which is slidable to couple corresponding gears carried by the main shaft and the driven shaft for the engagement of reverse.

In all transverse gearboxes of the type defined above currently in production, synchronising means are provided only for engagement of the forward gears, while engagement of reverse remains unsynchronised and is usually achieved by a double transmission between the main shaft and the driven shaft. In this case, engagement is achieved by the axial displacement of the idle gear carried by the intermediate shaft by means of an operating fork and by the consequent meshing of its teeth on one side and on the other side with the toothed sleeve for engagement of the first and second or the third and fourth gear ratios fixed for rotation with the driven shaft. This engagement, which is facilitated by bevelling of the facing teeth of the gears constituting the group of three, often gives rise to obvious noisiness due to mutual friction between the cusps of the bevelling when they are brought together. This is obviously due to the fact that the gears to be coupled are not synchronised with each other, that is, they are not rotating at the same speed. In particular, the main shaft may still be rotating due to inertia or be driven by the clutch which has not been correctly disengaged by the driver of the vehicle in which the gearbox is installed, and the driven shaft may be rotating in the opposite sense to the main shaft since it is connected to the wheels which have not yet completely stopped.

Known solutions for synchronising the engagement of reverse are those used on longitudinal gearboxes and conventionally include three permanently-meshed helical gears and a synchronising unit positioned between the driven shaft and the driven reversing gear, in common with that of the fifth or first forward gear ratio.

These technically valid solutions cannot be adapted for transverse gearboxes due to the unacceptable increase in axial bulk which would be required for the power unit.

Another solution, described in the document EP-A-204664, consists of a conventional engagement system with an idle gear slidable on the intermediate shaft, combined with a mechanism for braking the main shaft, which is operated by the same control rod as reverse and tends to limit the relative velocity between the bevels of the gears at the moment of engagement by cancelling out the rotation of the main shaft.

This solution does not ensure efficient synchronisation in all possible running conditions, particularly during very quick changes from forward to reverse gear, during engagement when the vehicle has not completely stopped, and also during engagement when the clutch is not completely disengaged.

The object of the present invention is that of producing a gearbox of the type described above, provided with means for synchronising the engagement of reverse which are designed to ensure complete synchronisation, that is, engagement of reverse only with equal rates of rotation of the corresponding gears, in all the possible operating situations of the gearbox and of the vehicle in which it is installed, without requiring an appreciable increase in the bulk of the gearbox.

According to the invention, this object is achieved by virtue of the fact that the means for synchronising the engagement of reverse are carried by the intermediate shaft.

These synchronising means conveniently include: a gear mounted idly on the intermediate shaft beside the idle gear and having a seat with an internal conical synchronising surface followed by a restraining ring gear, a ring gear provided on one of the sliding coupling sleeves and meshing with the said gear, a toothed hub fixed to the idle gear for meshing with the restraining ring gear of the said gear and carrying a toothed synchronising ring with an external conical synchronising surface, resilient presynchronising ring arranged in correspondence with a circumferential groove in the toothed hub and operatively associated with the toothed ring having the external conical synchronising surface.

Preferably, an axial stop ring is also inserted in the seat of the gear and can cooperate with the synchronising ring.

By virtue of the above characteristics, the gearbox according to the invention enables perfect synchronisation of the engagement of reverse to be ensured in all operating conditions and from this point of view it has many advantages compared with conventional transverse gearboxes with braking of the main shaft. It also has advantages over synchronisation systems with a synchronising unit on the driven shaft, used in longitudinal gearboxes, in that the arrangement of the synchronising means on the intermediate shaft does not involve increased axial bulk of the power unit. This arrangement does not involve appreciable variations in bulk in a radial direction either, so that, in practice, the synchronisation system according to the invention may be installed without modification of the casing of the gearbox even in existing gearboxes.

The invention will now be described in detail with reference to the appended drawing, provided purely by way of non-limiting example, which shows schematically and in longitudinal section a part of a gearbox according to the invention.

Briefly, the invention proposes a reversing system for a gearbox constituted by a fixed, double-cylindrical straight-toothed transmission between the main and driven shafts, and by a synchronised engagement device on the intermediate shaft of the transmission.

With reference to the drawings, a portion of the main shaft of a motor vehicle gearbox is indicated 1 and the axis of the driven shaft is indicated 2, and between these is interposed an intermediate reversing shaft 3. Two gears 4, 5 for the first and second forward gear ratios respectively are formed on the illustrated portion of the main shaft 1 and are permanently meshed with respective gears 6, 7 which are mounted idly on the driven shaft 2 and can be selectively made fast for rotation therewith by means of a slidable coupling sleeve 8 and respective synchronising devices 9, 10 of conventional type.

A reversing pinion, indicated 11, is formed on the main shaft 1 between the gears 4 and 5 and is meshed with an idle reversing gear 12 mounted idly on a sleeve 13, in turn supported by the intermediate shaft 3 and locked for rotation relative to the gearbox housing 14, and hence relative to the intermediate shaft 3, by means of a coupling 15 with frontal teeth 5. The reversing gear 12 is movable axially along the sleeve 13 by means of a fork 16 operated in known manner by a control rod, not illustrated.

A gear, indicated 17, is rotatably supported beside the sleeve 13 by the intermediate shaft 3, by means of a roller bearing 18, and has a ring gear 20 permanently meshed with a ring gear 19 of the coupling sleeve 8. The gear 17 also has an internal restraining ring gear 21 engageable, in the manner explained below, by a toothed hub 22 projecting from the reversing gear 12 towards the gear 17.

The internal restraining ring gear 21 of the gear 17 is followed, on the side of the reversing gear 12, by a seat 25 forming an internal conical synchronising surface 26 arranged to cooperate, in the manner explained below, with an external conical surface 24 of a synchronising ring 23 supported by the toothed hub 22 of the reversing gear 12 and having internal end teeth 23a arranged to mesh, as described below, with the teeth of the hub 22.

In the example illustrated, the ring 23 is of the B.W. inverted-cone type: it should be noted, however, that this could have a different configuration, for example, of the Porsche type.

An external circumferential groove is formed in the toothed hub 22 of the reversing gear 12 and carries a resilient presynchronising ring 28 arranged to cooperate with the inner surface of the synchronising ring 23. Furthermore, an annular groove 30 is formed near the outer end of the conical synchronising surface 26 of the gear 17 and an axial stop ring 29 is engaged therein.

In operation, when in forward gear or in neutral, the system for the engagement of reverse is deactivated, and the gear 12 and the gear 17 are free to rotate independently from each other on the intermediate shaft 3 without transmitting drive. The gear 12, however, is permanently meshed with the pinion 11 of the main shaft 1 and the gear 17 is permanently meshed with the coupling sleeve 8, so that their rates of rotation correspond respectively, with that of the main shaft 1 and that of the driven shaft 1 determined by the gear ratio.

When reverse gear is engaged, the fork 16 causes the reversing gear 12 to slide on the sleeve 13 towards the gear 17. During the initial stage of the movement of the gear 12, the resilient ring 28 pushes the synchronising ring 23 radially outwardly, bringing about a presynchronisation stage due to engagement between the conical surfaces 24 and 26. As the engagement maneuver continues, the synchronising ring 23 is stopped axially so that, due to the thrust exerted on the gear 12 by the fork 16, the resilient ring 28 is thrust into the groove 27, thus allowing the toothed hub 22 to move further towards the gear 17. In this way, the bevelled surfaces of the teeth of the hub 22 are meshed with gear 23a of the synchronising ring 23 under pressure and synchronisation thus occurs between the gear 12 and the gear 17. In the last stage of axial movement of the gear 12, engagement takes place between the toothed hub 22 and the internal restraining gear 21, and the reverse gear 12 thus becomes meshed with the gear 17. The drive is therefore transmitted between the main shaft 1 and the driven shaft 2 with reversal of the drive of the latter.

During the disengagement maneuver, the stop ring 29 causes repositioning of the synchronising ring 23 on the toothed hub 22 in the initial starting configuration.

It is clear from the above that the above-described arrangement of the synchronising means for the engagement of reverse on the intermediate shaft 3 enables the axial bulk of the gearbox according to the invention to remain unaltered with respect to conventional gearboxes, while ensuring complete synchronisation in any operative conditions of the gearbox and the vehicle in which it is installed.

It should be noted that alternative configurations of the synchronising means, differing from that described by way of example with reference to the drawings, fall within the scope of the invention. For example, the drive for the reversing gear 12 on the main shaft 1 could be arranged between the third and fourth forward gear ratios and in this case the drive output to the driven shaft would be constituted by a sleeve coupling the third and fourth gear ratios. In both configurations, the synchronising ring 23 between the reversing gear 12 and the gear 17 could be of the Porsche type.

According to another alternative configuration, two intermediate transmission shafts could be provided, having synchronisation between the reversing gear 12 and the gear 17 on the main intermediate shaft and having a synchronising ring 23 of the B.W. type. In this case, the drive from the main shaft would be constituted by the driving gear of the first or second gear ratio, while the drive to the driven shaft would be transmitted through the driven gear of the third or fourth gear ratio respectively.

We claim:

1. A gearbox for motor vehicles, including a main shaft and a driven shaft carrying respective meshed gears of which those carried by the driven shaft can be made fast for rotation therewith by means of respective slidable coupling sleeves, and an intermediate reversing shaft carrying an idle reversing gear which is slidable to couple corresponding gears carried by the main shaft and the driven shaft for the engagement of reverse, and means for synchronizing the engagement of reverse, characterized in that the synchronizing means (22, 23, 24, 25, 28) are carried by the intermediate shaft (3), wherein the synchronizing means include:

a gear (17) mounted rotatably on the intermediate shaft (3) beside the idle reversing gear (12) and having a seat (25) with an internal conical synchronizing surface (26) followed by a restraining ring gear (21), a ring gear (19) provided on one of the slidable coupling sleeves (8) and meshing with the said gear (17), a toothed hub (22) fixed to the idle reversing gear (12) for meshing with the restraining ring gear (21) of the said gear (17) and carrying a partially-toothed (23a) synchronizing ring (26) with an external conical synchronizing surface (24) inserted into the seat (25) of the gear (17) having the internal conical synchronizing surface (26), a resilient presynchronizing ring (28) arranged in correspondence with a circumferential groove (27) in the toothed hub (22) of the reversing gear (12) and operatively associated with the synchronizing ring (23).

2. A gearbox according to claim 1, characterized in that it also includes an axial stop ring (29) inserted in the seat (25) of the gear (17) and able to cooperate with the synchronizing ring (23).

* * * * *